United States Patent
Miyazaki et al.

(10) Patent No.: US 10,829,620 B2
(45) Date of Patent: Nov. 10, 2020

(54) RESIN COMPOSITION AND RESIN MOLDED BODY

(71) Applicant: Eastman Chemical Company, Kingsport, TN (US)

(72) Inventors: Kana Miyazaki, Kanagawa (JP); Ryo Tanaka, Kanagawa (JP); Masahiro Moriyama, Kanagawa (JP); Kenji Yao, Kanagawa (JP)

(73) Assignee: Eastman Chemical Company, Kingsport, TN (US)

( * ) Notice: Subject to any disclaimer, the term of this patent is extended or adjusted under 35 U.S.C. 154(b) by 35 days.

(21) Appl. No.: 16/104,942

(22) Filed: Aug. 19, 2018

(65) Prior Publication Data

US 2019/0276642 A1  Sep. 12, 2019

(30) Foreign Application Priority Data

Mar. 6, 2018 (JP) ................. 2018-039553

(51) Int. Cl.
*C08L 1/14* (2006.01)
*B29C 45/00* (2006.01)
*B29K 1/00* (2006.01)

(52) U.S. Cl.
CPC ............ *C08L 1/14* (2013.01); *B29C 45/0001* (2013.01); *B29K 2001/12* (2013.01); *C08L 2205/03* (2013.01)

(58) Field of Classification Search
CPC ... C08L 1/14; C08L 2205/03; B29K 2001/12; B29C 45/0001
USPC ......................................... 524/314
See application file for complete search history.

(56) References Cited

U.S. PATENT DOCUMENTS

2016/0090473 A1* 3/2016 Yao ........................ C08L 1/10
524/40

FOREIGN PATENT DOCUMENTS

JP  2016-69423  5/2016

* cited by examiner

*Primary Examiner* — Hui H Chin
(74) *Attorney, Agent, or Firm* — Robert C. Morriss

(57) ABSTRACT

A resin composition contains cellulose acylate (A), a polyester resin (B), at least one compound (C) selected from the group consisting of cardanol compounds and ester compounds having a molecular weight of about 250 or more and about 2000 less, and a water-absorbing compound (D).

15 Claims, No Drawings

RESIN COMPOSITION AND RESIN MOLDED BODY

CROSS-REFERENCE TO RELATED APPLICATIONS

This application is based on and claims priority under 35 USC 119 from Japanese Patent Application No. 2018-039553 filed Mar. 6, 2018.

BACKGROUND

(i) Technical Field

The present invention relates to a resin composition and a resin molded body.

(ii) Related Art

In the related art, various resin compositions are provided and used in a wide range of applications. Resin compositions are used particularly in, for example, various parts and housings of home appliances and automobiles.

Thermoplastic resins are also used in parts, such as housings, of office machines and electrical and electronic devices.

In recent years, plant-derived resins have been used, and one of plant-derived resins known in the art is cellulose acylate.

A resin composition containing cellulose acylate (A), a polyester resin (B), and an ester compound having a molecular weight of about 250 or more and about 2000 or less is a resin composition having high fluidity and suitable for producing a resin molded body. The produced resin molded body, however, tends to still have low dimensional stability against water. Since the cellulose acylate (A) has many polar moieties, such as a hydroxyl group and an ester bond, the resin molded body formed of the resin composition may swell as a result of absorption of water and thus have low dimensional stability.

The resin composition containing the cellulose acylate (A), the polyester resin (B), and the ester compound having a molecular weight of about 250 or more and about 2000 or less may tend to cause cracks in response to stress due to absorption of water. In exemplary embodiments, a suppressed tendency to generate cracks in response to stress due to absorption of water is also referred to as "stress-cracking resistance against water".

SUMMARY

According to an aspect of the invention, there is provided a resin composition containing cellulose acylate (A), a polyester resin (B), at least one compound (C) selected from the group consisting of cardanol compounds and ester compounds having a molecular weight of about 250 or more and about 2000 or less, and a water-absorbing compound (D).

DETAILED DESCRIPTION

Exemplary embodiments of the present invention will be described below.

In this specification, the amount of each component in an object refers to, when there are several substances corresponding to each component in the object, the total amount or total proportion of the substances present in the object, unless otherwise specified.

The expression "polymer of A" encompasses a homopolymer of only A and a copolymer of A and a monomer other than A. Similarly, the expression "copolymer of A and B" encompasses a copolymer of only A and B (hereinafter referred to as a "homocopolymer" for convenience) and a copolymer of A, B, and a monomer other than A and B.

The cellulose acylate (A), the polyester resin (B), the compound (C), the water-absorbing compound (D), a polymer (E), and a poly(meth)acrylate compound (F) are also referred to as a component (A), a component (B), a component (C), a component (D), a component (E), and a component (F), respectively.

Resin Composition

A resin composition according to an exemplary embodiment contains cellulose acylate (A), a polyester resin (B), at least one compound (C) selected from the group consisting of cardanol compounds and ester compounds having a molecular weight of about 250 or more and about 2000 or less, and a water-absorbing compound (D).

The resin composition according to the exemplary embodiment may also contain other components, such as a polymer (E) and a poly(meth)acrylate compound (F).

In the related art, cellulose acylate (A) (specifically, cellulose acylate in which one or more hydroxyl groups are substituted with one or more acyl groups) is derived from a non-edible source and is an environmentally friendly resin material because it is a primary derivative without a need of chemical polymerization. The cellulose acylate (A) has a high elastic modulus among resin materials due to its strong hydrogen bonds. Furthermore, the cellulose acylate (A) may have high transparency because of its alicyclic structure.

Since the cellulose acylate (A), as described above, has many polar moieties, such as a hydroxyl group and an ester bond, the obtained resin molded body may swell as a result of absorption of water and may thus have low dimensional stability. Even when the cellulose acylate (A) is simply mixed with the water-absorbing compound (D), the obtained resin molded body may have low dimensional stability because of low dispersibility of the water-absorbing compound (D) in the cellulose acylate (A).

However, a resin molded body formed of a resin composition containing the cellulose acylate (A), the compound (C), and the water-absorbing compound (D) may have high dimensional stability but may have low stress-cracking resistance because the rate of water absorption when the resin molded body absorbs water is too high and thus the resin molded body undergoes cracks in response to stress.

The resin composition according to the exemplary embodiment provides a resin molded body that may have high stress-cracking resistance against water and high dimensional stability against water compared with a resin composition containing only the cellulose acylate (A), the polyester resin (B), and an ester compound having a molecular weight of about 250 or more and about 2000 or less. The reason for this is assumed as described below.

When the cellulose acylate (A), the polyester resin (B), the compound (C), and the water-absorbing compound (D) are used, the rate of water absorption may be low with the dispersibility of the water-absorbing compound (D) maintained. This provides a resin molded body that may have high stress-cracking resistance against water. In this case, the water-absorbing compound (D) is dispersed well. This provides a resin molded body that may have high dimensional stability against water.

From the above-described reason, the resin molded body according to the exemplary embodiment is assumed to be a resin molded body that may have high stress-cracking resistance against water and high dimensional stability against water.

Hereinafter, the components of the resin composition according to the exemplary embodiment will be described in detail.

Cellulose Acylate (A): Component (A)

The cellulose acylate (A) is, for example, a resin of a cellulose derivative in which at least one or more hydroxyl groups in cellulose are substituted with one or more acyl groups (acylation). Specifically, the cellulose acylate (A) is, for example, a cellulose derivative represented by general formula (CE).

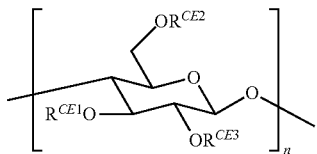

General Formula (CE)

In general formula (CE), $R^{CE1}$, $R^{CE2}$, and $R^{CE3}$ each independently represent a hydrogen atom or an acyl group, and n represents an integer of 2 or more. It is noted that at least one or more of n $R^{CE1}$'s, n $R^{CE2}$'s, and n $R^{CE3}$'s represent an acyl group.

The acyl groups represented by $R^{CE1}$, $R^{CE2}$ and $R^{CE3}$ may be acyl groups having 1 or more and 6 or less carbon atoms.

In general formula (CE), n is preferably, but not necessarily, 200 or more and 1000 or less, and more preferably 500 or more and 1000 or less.

The expression "in general formula (CE), $R^{CE1}$, $R^{CE2}$ and $R^{CE3}$ each independently represent an acyl group" means that at least one or more hydroxyl groups in the cellulose derivative represented by general formula (CE) are acylated.

Specifically, n $R^{CE1}$'s in the molecule of the cellulose derivative represented by general formula (CE) may be all the same, partially the same, or different from each other. The same applies to n $R^{CE2}$'s and n $R^{CE3}$'s.

The cellulose acylate (A) may have, as an acyl group, an acyl group having 1 or more and 6 or less carbon atoms.

In this case, a resin molded body in which a decrease in transparency may be suppressed and which may have high impact resistance is obtained easily compared with the case where the cellulose acylate (A) has an acyl group having 7 or more carbon atoms.

The acyl group has a structure represented by "—CO—$R^{AC}$", where $R^{AC}$ represents a hydrogen atom or a hydrocarbon group (may be a hydrocarbon group having 1 or more and 5 or less carbon atoms).

The hydrocarbon group represented by $R^{AC}$ may be a linear, branched, or cyclic hydrocarbon group, and is preferably a linear hydrocarbon group.

The hydrocarbon group represented by $R^{AC}$ may be a saturated hydrocarbon group or an unsaturated hydrocarbon group and is preferably a saturated hydrocarbon group.

The hydrocarbon group represented by $R^{AC}$ may have atoms (e.g., oxygen, nitrogen) other than carbon and hydrogen, and is preferably a hydrocarbon group composed of carbon and hydrogen.

Examples of the acyl group include a formyl group, an acetyl group, a propionyl group, a butyryl group (butanoyl group), a propenoyl group, and a hexanoyl group.

Among these groups, the acyl group is preferably an acyl group having 2 or more and 4 or less carbon atoms and more preferably an acyl group having 2 or more and 3 or less carbon atoms in order to improve the moldability of the resin composition and from the viewpoints of the stress-cracking resistance of the obtained resin molded body against water and the dimensional stability against water.

Examples of the cellulose acylate (A) include cellulose acetates (cellulose monoacetate, cellulose diacetate (DAC), and cellulose triacetate), cellulose acetate propionate (CAP), and cellulose acetate butyrate (CAB).

The cellulose acylate (A) may be used alone or in combination of two or more.

Among these substances, the cellulose acylate (A) is preferably cellulose acetate propionate (CAP) or cellulose acetate butyrate (CAB) and more preferably cellulose acetate propionate (CAP) from the viewpoints of the stress-cracking resistance of the obtained resin molded body against water and the dimensional stability against water.

The weight-average degree of polymerization of the cellulose acylate (A) is preferably 200 or more and 1000 or less, and more preferably 500 or more and 1000 or less in order to improve the moldability of the resin composition and from the viewpoints of the stress-cracking resistance of the obtained resin molded body against water and the dimensional stability against water.

The weight-average degree of polymerization is calculated from the weight-average molecular weight (Mw) in the following manner.

First, the weight-average molecular weight (Mw) of the cellulose acylate (A) is determined on a polystyrene basis with a gel permeation chromatography system (GPC system: HLC-8320GPC available from Tosoh Corporation, column: TSKgel α-M) using tetrahydrofuran.

Next, the weight-average molecular weight of the cellulose acylate (A) is divided by the molecular weight of the structural unit of the cellulose acylate (A) to produce the degree of polymerization of the cellulose acylate (A). For example, when the substituent of the cellulose acylate is an acetyl group, the molecular weight of the structural unit is 263 at a degree of substitution of 2.4 and 284 at a degree of substitution of 2.9.

The degree of substitution of the cellulose acylate (A) is preferably 2.1 or more and 2.8 or less, more preferably 2.2 or more and 2.8 or less, still more preferably 2.3 or more and 2.75 or less, and yet still more preferably 2.35 or more and 2.75 or less in order to improve the moldability of the resin composition and from the viewpoints of the stress-cracking resistance of the obtained resin molded body against water and the dimensional stability against water.

In cellulose acetate propionate (CAP), the ratio of the degree of substitution with the acetyl group to the degree of substitution with the propionyl group (acetyl group/propionyl group) is preferably from 5/1 to 1/20 and more preferably from 3/1 to 1/15 in order to improve the moldability of the resin composition and from the viewpoints of the stress-cracking resistance of the obtained resin molded body against water and the dimensional stability against water.

In cellulose acetate butyrate (CAB), the ratio of the degree of substitution with the acetyl group to the degree of substitution with the butyryl group (acetyl group/butyryl group) is preferably from 5/1 to 1/20 and more preferably from 4/1 to 1/15 in order to improve the moldability of the resin composition and from the viewpoints of the stress-cracking resistance of the obtained resin molded body against water and the dimensional stability against water.

The degree of substitution indicates the degree at which the hydroxyl groups of cellulose are substituted with acyl groups. In other words, the degree of substitution indicates the degree of acylation of the cellulose acylate (A). Specifically, the degree of substitution means the average number of hydroxyl groups per molecule substituted with acyl groups among three hydroxyl groups of the D-glucopyranose unit of the cellulose acylate.

The degree of substitution is determined from the integration ratio between the peak from hydrogen of cellulose and the peak from the acyl group using H1-NMR (JMN-ECA available from JEOL RESONANCE).

Polyester Resin (B): Component (B)

Examples of the polyester resin (B) include polymers of hydroxyalkanoates (hydroxyalkanoic acids), polycondensates of polycarboxylic acids and polyhydric alcohols, and ring-opened polycondensates of cyclic lactams.

The polyester resin (B) may be an aliphatic polyester resin. Examples of the aliphatic polyester include polyhydroxyalkanoates (polymers of hydroxyalkanoates) and polycondensates of aliphatic diols and aliphatic carboxylic acids.

Among these aliphatic polyesters, a polyhydroxyalkanoate is preferred as the polyester resin (B) from the viewpoints of the stress-cracking resistance of the obtained resin molded body against water and the dimensional stability against water.

The polyester resin (B) may be used alone or in combination of two or more.

Examples of the polyhydroxyalkanoate include a compound having a structural unit represented by general formula (PHA).

The compound having a structural unit represented by general formula (PHA) may include a carboxyl group at each terminal of the polymer chain (each terminal of the main chain) or may include a carboxyl group at one terminal and a different group (e.g., hydroxyl group) at the other terminal.

General Formula (PHA)

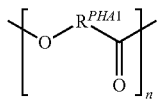

In general formula (PHA), $R^{PHA1}$ represents an alkylene group having 1 or more and 10 or less carbon atoms, and n represents an integer of 2 or more.

In general formula (PHA), the alkylene group represented by $R^{PHA1}$ may be an alkylene group having 3 or more and 6 or less carbon atoms. The alkylene group represented by $R^{PHA1}$ may be a linear alkylene group or a branched alkylene group and is preferably a branched alkylene group.

The expression "$R^{PHA1}$ in general formula (PHA) represents an alkylene group" indicates 1) having a [O—$R^{PHA1}$—C(=O)—] structure where $R^{PHA1}$ represents the same alkylene group, or 2) having plural [O—$R^{PHA1}$—C(=O)—] structures where $R^{PHA1}$ represents different alkylene groups ($R^{PHA1}$ represents alkylene groups different from each other in branching or in the number of carbon atoms (e.g., a [O—$R^{PHA1A}$—C(=O)—] [O—$R^{PHA1B}$—C(=O)—] structure).

In other words, the polyhydroxyalkanoate may be a homopolymer of one hydroxyalkanoate (hydroxyalkanoic acid) or may be a copolymer of two or more hydroxyalkanoates (hydroxyalkanoic acids).

In general formula (PHA), the upper limit of n is not limited, and n is, for example, 20,000 or less. For the range of n, n is preferably 500 or more and 10,000 or less, and more preferably 1,000 or more and 8,000 or less.

Examples of the polyhydroxyalkanoate include homopolymers of hydroxyalkanoic acids (e.g., lactic acid, 2-hydroxybutyric acid, 3-hydroxybutyric acid, 4-hydroxybutyric acid, 2-hydroxy-3-methylbutyric acid, 2-hydroxy-3,3-dimethylbutyric acid, 3-hydroxyvaleric acid, 4-hydroxyvaleric acid, 5-hydroxyvaleric acid, 3-hydroxyhexanoic acid, 2-hydroxyhexanoic acid, 2-hydroxyisohexanoic acid, 6-hydroxyhexanoic acid, 3-hydroxypropionic acid, 3-hydroxy-2,2-dimethylpropionic acid, 3-hydroxyhexanoic acid, and 2-hydroxy-n-octanoic acid), and copolymers of two or more of these hydroxyalkanoic acids.

Among these, the polyhydroxyalkanoate is preferably a homopolymer of a branched hydroxyalkanoic acid having 2 or more and 4 or less carbon atoms, or a homocopolymer of a branched hydroxyalkanoic acid having 2 or more and 4 or less carbon atoms and a branched hydroxyalkanoic acid having 5 or more and 7 or less carbon atoms, more preferably a homopolymer of a branched hydroxyalkanoic acid having 3 carbon atoms (i.e., polylactic acid), or a homocopolymer of 3-hydroxybutyric acid and 3-hydroxyhexanoic acid (i.e., polyhydroxybutyrate-hexanoate), and still more preferably a homopolymer of a branched hydroxyalkanoic acid having 3 carbon atoms (i.e., polylactic acid) in order to suppress a decrease in the transparency of the obtained resin molded body and improve impact resistance.

The number of carbon atoms in hydroxyalkanoic acid is a number inclusive of the number of the carbon of the carboxyl group.

Polylactic acid is a polymer compound formed by polymerization of lactic acid through ester bonding.

Examples of polylactic acid include a homopolymer of L-lactic acid, a homopolymer of D-lactic acid, a block copolymer including a polymer of at least one of L-lactic acid and D-lactic acid, and a graft copolymer including a polymer of at least one of L-lactic acid and D-lactic acid.

Examples of a "compound copolymerizable with L-lactic acid or D-lactic acid" include glycolic acid, dimethyl glycolic acid, 3-hydroxybutyric acid, 4-hydroxybutyric acid, 2-hydroxypropanoic acid, 3-hydroxypropanoic acid, 2-hydroxyvaleric acid, 3-hydroxyvaleric acid, and 4-hydroxyvaleric acid; polycarboxylic acids, such as oxalic acid, malonic acid, succinic acid, glutaric acid, adipic acid, pimelic acid, azelaic acid, sebacic acid, undecanedioic acid, dodecanedioic acid, and terephthalic acid, and anhydrides thereof; polyhydric alcohols, such as ethyleneglycol, diethyleneglycol, triethyleneglycol, 1,2-propanediol, 1,3-propanediol, 1,3-butanediol, 1,4-butanediol, 2,3-butanediol, 1,5-pentanediol, 1,6-hexanediol, 1,9-nonanediol, 3-methyl-1,5-pentanediol, neopentylglycol, tetramethyleneglycol, and 1,4-hexanedimethanol; polysaccharides, such as cellulose; aminocarboxylic acids, such as α-amino acid; hydroxycarboxylic acids, such as 5-hydroxyvaleric acid, 2-hydroxycaproic acid, 3-hydroxycaproic acid, 4-hydroxycaproic acid, 5-hydroxycaproic acid, 6-hydroxycaproic acid, 6-hydroxymethylcaproic acid, and mandelic acid; and cyclic esters, such as glycolide, 3-methyl-δ-valerolactone, γ-valerolactone, and ε-caprolactone.

Polylactic acid is known to be produced by: a lactide method via lactide; a direct polymerization method involving heating lactic acid in a solvent under a reduced pressure to polymerize lactic acid while removing water; or other methods.

In polyhydroxybutyrate-hexanoate, the copolymerization ratio of 3-hydroxyhexanoic acid (3-hydroxyhexanoate) to a copolymer of 3-hydroxybutyric acid (3-hydroxybutyrate) and 3-hydroxyhexanoic acid (3-hydroxyhexanoate) is preferably 3 mol % or more and 20 mol % or less, more preferably 4 mol % or more and 15 mol % or less, and still more preferably 5 mol % or more and 12 mol % or less from the viewpoints of the stress-cracking resistance of the obtained resin molded body against water and the dimensional stability against water.

The copolymerization ratio of 3-hydroxyhexanoic acid (3-hydroxyhexanoate) is determined using $H^1$-NMR such that the ratio of the hexanoate is calculated from the integrated values of the peaks from the hexanoate terminal and the butyrate terminal.

The weight-average molecular weight (Mw) of the polyester resin (B) may be 10,000 or more and 1,000,000 or less (preferably 50,000 or more and 800,000 or less, more preferably 100,000 or more and 600,000 or less) from the viewpoints of the stress-cracking resistance of the obtained resin molded body against water and the dimensional stability against water.

The weight-average molecular weight (Mw) of the polyester resin (B) is a value determined by gel permeation chromatography (GPC). Specifically, the determination of the molecular weight by GPC is carried out using HLC-8320GPC available from Tosoh Corporation as a measurement system, columns TSKgel GMHHR-M+TSKgel GMHHR-M (7.8 mm I.D., 30 cm) available from Tosoh Corporation, and a chloroform solvent. The weight-average molecular weight (Mw) is calculated from the molecular weight calibration curve created on the basis of the obtained measurement results using a monodisperse polystyrene standard.

At Least One Compound (C) Selected from Group Consisting of Cardanol Compounds and Ester Compounds Having Molecular Weight of About 250 or More and About 2000 or Less: Component (C) At least one compound (C) [compound (C)] selected from the group consisting of cardanol compounds and ester compounds having a molecular weight of about 250 or more and about 2000 or less may include either a cardanol compound or the ester compound or may include both a cardanol compound and the ester compound. In particular, a cardanol compound may be contained as the compound (C) from the viewpoint of transparency, and the ester compound may be contained as the compound (C) from the viewpoint of plane impact.

The compound (C) may be used alone or in combination of two or more.

Cardanol Compound

The cardanol compounds refer to components (e.g., the compounds (1) to (4) described below) included in naturally occurring compounds derived from cashews or refer to derivatives from the components.

The cardanol compounds may be used alone or in combination of two or more.

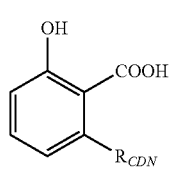
(1)

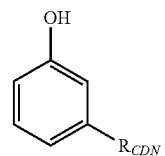
(2)

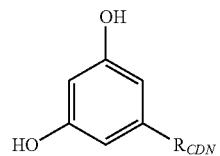
(3)

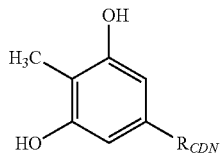
(4)

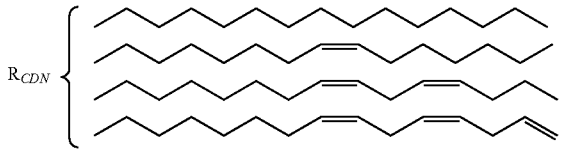

In other words, the resin composition according to the exemplary embodiment may contain, as cardanol compounds, a mixture (hereinafter referred simply as a "cashew-derived mixture") of naturally occurring compounds derived from cashews.

The resin composition according to the exemplary embodiment may contain derivatives from a mixture (cashew-derived mixture) of naturally occurring compounds derived from cashews.

Examples of the derivatives include the following mixtures and simple substances.

- a mixture in which the proportion of each component in the cashew-derived mixture is controlled
- a simple substance obtained by isolating only a specific component from the cashew-derived mixture
- a mixture containing modified components produced by modifying components in the cashew-derived mixture
- a mixture containing polymers produced by polymerizing components in the cashew-derived mixture
- a mixture containing modified polymers produced by modifying and polymerizing components in the cashew-derived mixture
- a mixture containing modified components produced by modifying components in the mixture in which the proportion of each component is controlled
- a mixture containing polymers produced by polymerizing components in the mixture in which the proportion of each component is controlled
- a mixture containing modified polymers produced by modifying and polymerizing components in the mixture in which the proportion of each component is controlled
- a modified component produced by modifying the isolated simple substance
- a polymer produced by polymerizing the isolated simple substance
- a modified polymer produced by modifying and polymerizing the isolated simple substance The polymer includes multimers, such as a dimer and a trimer.

General Formula (CDN1)

The cardanol compound may be at least one compound selected from the group consisting of compounds represented by general formula (CDN1) and a polymer produced by polymerizing the compounds represented by general formula (CDN1).

When the resin composition contains at least one compound selected from the group consisting of compounds represented by general formula (CDN1) and a polymer produced by polymerizing the compounds represented by general formula (CDN1), the obtained resin molded body may have high impact resistance.

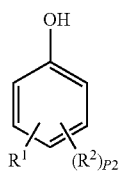

General Formula (CDN1)

In general formula (CDN1), $R^1$ represents an alkyl group optionally having a substituent or an unsaturated aliphatic group having a double bond and optionally having a substituent. $R^2$ represents a hydroxyl group, a carboxy group, an alkyl group optionally having a substituent, or an unsaturated aliphatic group having a double bond and optionally having a substituent. P2 represents an integer of 0 or more and 4 or less. Two or more $R^2$'s present when P2 represents an integer of 2 or more may be the same group or different groups.

In general formula (CDN1), the alkyl group optionally having a substituent represented by $R^1$ is preferably an alkyl group having 3 or more and 30 or less carbon atoms, more preferably an alkyl group having 5 or more and 25 or less carbon atoms, and still more preferably an alkyl group having 8 or more and 20 or less carbon atoms.

Examples of the substituent include a hydroxyl group; substituents including an ether bond, such as an epoxy group and a methoxy group; and substituents including an ester bond, such as an acetyl group and a propionyl group.

Examples of the alkyl group optionally having a substituent include a pentadecan-1-yl group, a heptan-1-yl group, an octan-1-yl group, a nonan-1-yl group, a decan-1-yl group, an undecan-1-yl group, a dodecan-1-yl group, and a tetradecan-1-yl group.

In general formula (CDN1), the unsaturated aliphatic group having a double bond and optionally having a substituent represented by $R^1$ is preferably an unsaturated aliphatic group having 3 or more and 30 or less carbon atoms, more preferably an unsaturated aliphatic group having 5 or more and 25 or less carbon atoms, and still more preferably an unsaturated aliphatic group having 8 or more and 20 or less carbon atoms.

The number of double bonds in the unsaturated aliphatic group may be 1 or more and 3 or less.

Examples of the substituent include the examples listed as the substituent of the alkyl group.

Examples of the unsaturated aliphatic group having a double bond and optionally having a substituent include a pentadec-8-en-1-yl group, a pentadeca-8,11-dien-1-yl group, a pentadeca-8,11,14-trien-1-yl group, a pentadec-7-en-1-yl group, a pentadeca-7,10-dien-1-yl group, and a pentadeca-7,10,14-trien-1-yl group.

In general formula (CDN1), $R^1$ may be a pentadec-8-en-1-yl group, a pentadeca-8,11-dien-1-yl group, a pentadeca-8,11,14-trien-1-yl group, a pentadec-7-en-1-yl group, a pentadeca-7,10-dien-1-yl group, and a pentadeca-7,10,14-trien-1-yl group.

In general formula (CDN1), examples of the alkyl group optionally having a substituent and the unsaturated aliphatic group having a double bond and optionally having a substituent represented by $R^2$ include the examples listed as the alkyl group optionally having a substituent and the unsaturated aliphatic group having a double bond and optionally having a substituent represented by $R^1$.

The compound represented by general formula (CDN1) may be modified. For example, the compound represented by general formula (CDN1) may be epoxidized, specifically, may be a compound having a structure in which the hydroxyl group (—OH) of the compound represented by general formula (CDN1) is replaced by the group represented by the group (EP) described below.

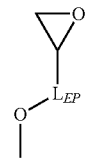

Group (EP)

In the group (EP), $L_{EP}$ represents a linear chain or a divalent linking group.

The polymer produced by polymerizing the compounds represented by general formula (CDN1) refers to a polymer produced by polymerizing at least two or more compounds represented by general formula (CDN1) through or without a linking group.

Examples of the polymer produced by polymerizing the compounds represented by general formula (CDN1) include the compounds represented by general formula (CDN2) below.

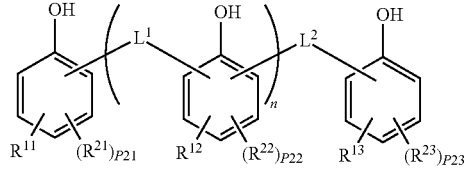

General Formula (CDN2)

In general formula (CDN2), $R^{11}$, $R^{12}$, and $R^{13}$ each independently represent an alkyl group optionally having a substituent or an unsaturated aliphatic group having a double bond and optionally having a substituent. $R^{21}$, $R^{22}$, and $R^{23}$ each independently represent a hydroxyl group, a carboxy group, an alkyl group optionally having a substituent, or an unsaturated aliphatic group having a double bond and optionally having a substituent. P21 and P23 each independently represent an integer of 0 or more and 3 or less, and P22 represents an integer of 0 or more and 2 or less. $L^1$ and $L^2$ each independently represent a divalent linking group. n represents an integer of 0 or more and 10 or less. Two or more $R^{21}$'s present when P21 represents an integer of 2 or more may be the same group or different groups. Two or more $R^{22}$'s present when P22 represents an integer of 2 or more may be the same group or different groups. Two or more $R^{23}$'s present when P23 represents an integer of 2 or more may be the same group or different groups. The same applies to two or more $R^{12}$'s, $R^{22}$'s, and $L^1$'s present when n represents an integer of 2 or more. Two or more P22's present when n represents an integer of 2 or more may represent the same number or different numbers.

Examples of the alkyl group optionally having a substituent and the unsaturated aliphatic group having a double bond and optionally having a substituent represented by $R^{11}$, $R^{12}$, $R^{13}$, $R^{21}$, $R^{22}$, and $R^{23}$ in general formula (CDN2) include the examples listed as the alkyl group optionally having a substituent and the unsaturated aliphatic group having a double bond and optionally having a substituent represented by $R^1$ in general formula (CDN1).

In general formula (CDN2), examples of the divalent linking group represented by $L^1$ and $L^2$ include alkylene groups optionally having a substituent (preferably alkylene groups having 2 or more and 30 or less carbon atoms, more preferably alkylene groups having 5 or more and 20 or less carbon atoms).

Examples of the substituent include the examples listed as the substituent in $R^1$ of general formula (CDN1).

In general formula (CDN2), n is preferably 1 or more and 10 or less, and more preferably 1 or more and 5 or less.

The compound represented by general formula (CDN2) may be modified. For example, the compound represented by general formula (CDN2) may be epoxidized, specifically, may be a compound having a structure in which the hydroxyl group (—OH) of the compound represented by general formula (CDN2) is replaced by the group represented by the group (EP).

The polymer produced by polymerizing the compounds represented by general formula (CDN1) may be, for example, a polymer produced by three-dimensional cross-linking polymerization of at least three or more compounds represented by general formula (CDN1) through or without a linking group. Examples of the polymer produced by three-dimensional cross-linking polymerization of the compounds represented by general formula (CDN1) include the compounds having the following structure.

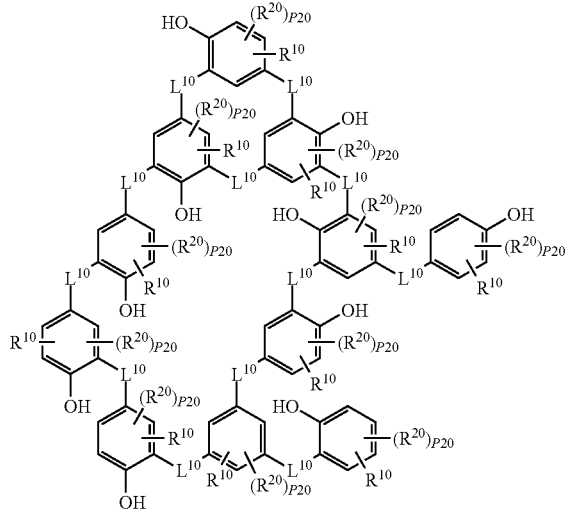

$R^{10}$, $R^{20}$, P20, and $L^{10}$ in the structural formula have the same definitions as $R^1$, $R^2$, P2, and L in general formula (CDN1), respectively. Two or more $R^{10}$'s may be the same group or different groups, two or more $R^{20}$'s may be the same group or different groups, and two or more $L^{10}$'s may be the same group or different groups. Two or more P20's may represent the same number or different numbers.

The compound represented by the above-described structural formula may be modified. For example, the compound represented by the structural formula may be epoxidized, specifically, may be a compound having a structure in which the hydroxyl group (—OH) of the compound represented by the structural formula is replaced by the group represented by the group (EP).

The cardanol compound preferably includes a cardanol compound having an epoxy group and is more preferably a cardanol compound having an epoxy group in order to improve the transparency of the obtained resin molded body.

The cardanol compound may be a commercial product.

Examples of the commercial product include NX-2024, Ultra LITE 2023, NC-510, LITE 2020, NX-9001, NX-9004, NX-9007, NX-9008, NX-9201, and NX-9203 available from Cardolite Corporation; and LB-7000, LB-7250, and CD-5L available from Tohoku Chemical Industries, Ltd.

Examples of the commercial product of the cardanol compound having an epoxy group include NC-513, NC-514S, NC-547, LITE 513E, and Ultra LITE 513 available from Cardolite Corporation.

The hydroxyl value of the cardanol compound is preferably 100 mg KOH/g or more, more preferably 120 mg KOH/g or more, and still more preferably 150 mg KOH/g or more from the viewpoint of the impact resistance of the obtained resin molded body.

The hydroxyl value of the cardanol compound is measured in accordance with Method A in ISO 14900.

When a cardanol compound having an epoxy group is used as a cardanol compound, the epoxy equivalent is preferably 300 or more and 500 or less, more preferably 350 or more and 480 or less, and still more preferably 400 or more and 470 or less in order to improve the transparency of the obtained resin molded body.

The epoxy equivalent of the cardanol compound having an epoxy group is measured in accordance with ISO 3001.

Ester Compound

The ester compound is a compound having an ester group (—C(=O)O—) and a molecular weight of about 250 or more and about 2000 or less (preferably about 250 or more and about 1000 or less, more preferably about 250 or more and about 600 or less).

The ester compound may be used alone or in combination of two or more.

In combinational use of two or more ester compounds, ester compounds having a molecular weight of about 250 or more and about 2000 or less are used in combination.

Examples of the ester compound include fatty acid ester compounds and aromatic carboxylic acid ester compounds.

Among these ester compounds, the ester compound is preferably a fatty acid ester compound from the viewpoints of the stress-cracking resistance of the obtained resin molded body against water and the dimensional stability against water.

Examples of the fatty acid ester compound include aliphatic monocarboxylic acid esters (e.g., acetic acid ester), aliphatic dicarboxylic acid esters (e.g., succinic acid esters, adipic acid ester-containing compounds, azelaic acid esters, sebacic acid esters, stearic acid esters), aliphatic tricarboxylic acid esters (e.g., citric acid esters, isocitric acid esters), ester group-containing epoxidized compounds (epoxidized soybean oil, epoxidized linseed oil, epoxidized fatty acid butyl esters, and epoxidized fatty acid 2-ethylhexyl), fatty acid methyl esters, fatty acid butyl esters, and sucrose esters.

Examples of the aromatic carboxylic acid ester compound include dimethyl phthalate, diethyl phthalate, bis(2-ethylhexyl) phthalate, and terephthalic acid esters.

Among these compounds, the ester compound is preferably an aliphatic dicarboxylic acid ester or an aliphatic tricarboxylic acid ester, more preferably an adipic acid ester-containing compound or a citric acid ester, and still more preferably an adipic acid ester-containing compound from the viewpoints of the stress-cracking resistance of the obtained resin molded body against water and the dimensional stability against water.

The adipic acid ester-containing compound (a compound containing an adipic acid ester) refers to a compound of only an adipic acid ester or a mixture of an adipic acid ester and a component other than the adipic acid ester (a compound different from the adipic acid ester). The adipic acid ester-containing compound may contain 50 mass % or more of the adipic acid ester relative to the total mass of all components.

Examples of the adipic acid ester include adipic acid diesters. Specific examples include the adipic acid diesters represented by general formula (AE) below.

General Formula (AE)

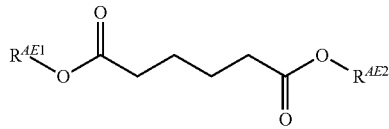

In general formula (AE), $R^{AE1}$ and $R^{AE2}$ each independently represent an alkyl group or a polyoxyalkyl group $[-(C_xH_{2x}-O)_y-R^{A1}]$ (where $R^{A1}$ represents an alkyl group, x represents an integer of 1 or more and 10 or less, and y represents an integer of 1 or more and 10 or less).

The alkyl group represented by $R^{AE1}$ and $R^{AE2}$ in general formula (AE) is preferably an alkyl group having 1 or more and 6 or less carbon atoms, and more preferably an alkyl group having 1 or more and 4 or less carbon atoms. The alkyl group represented by $R^{AE1}$ and $R^{AE2}$ may be a linear, branched, or cyclic alkyl group, and is preferably a linear or branched alkyl group.

The alkyl group represented by $R^{A1}$ in the polyoxyalkyl group $[-(C_xH_{2x}-O)_y-R^{A1}]$ represented by $R^{AE1}$ and $R^{AE2}$ in general formula (AE) is preferably an alkyl group having 1 or more and 6 or less carbon atoms, and more preferably an alkyl group having 1 or more and 4 or less carbon atoms. The alkyl group represented by $R^{A1}$ may be a linear, branched, or cyclic alkyl group, and is preferably a linear or branched alkyl group.

In general formula (AE), the group represented by each reference character is optionally substituted with a substituent. Examples of the substituent include an alkyl group, an aryl group, and a hydroxyl group.

Examples of the citric acid ester include citric acid alkyl esters having 1 or more and 12 or less carbon atoms (preferably 1 or more and 8 or less carbon atoms). The citric acid ester may be a citric acid ester acylated by an alkyl carboxylic anhydride (e.g., a linear or branched alkyl carboxylic anhydride having 2 or more and 6 or less carbon atoms (preferably 2 or more and 3 or less carbon atoms), such as acetic anhydride, propionic anhydride, butyric anhydride, or valeric anhydride).

Water-absorbing Compound (D): Component (D) The water-absorbing compound (D) in the exemplary embodiment refers to a compound capable of absorbing 0.01 g or more of water per gram of the compound at 25° C., preferably a compound capable of absorbing 0.05 g or more of water per gram of the compound at 25° C., more preferably a compound capable of absorbing 0.10 g or more of water per gram of the compound at 25° C.

The water-absorbing compound (D) may be a compound capable of releasing absorbed water when it is dried.

The water-absorbing compound (D) may be a compound having a solubility (25° C.) in water of less than 1 g/100 g.

The water-absorbing compound (D) may be used alone or in combination of two or more.

The water-absorbing compound (D) may be a water-absorbing polymer compound from the viewpoints of the stress-cracking resistance of the obtained resin molded body against water and the dimensional stability against water.

The percentage of water absorption of the water-absorbing compound (D) is preferably about 5 mass % or more, more preferably about 10 mass % or more, still more preferably about 10 mass % or more and about 1,000 mass % or less, yet still more preferably about 50 mass % or more and about 500 mass % or less from the viewpoints of the stress-cracking resistance of the obtained resin molded body against water and the dimensional stability against water.

The water-absorbing compound (D) may have a hydrophilic group.

From the viewpoints of the stress-cracking resistance of the obtained resin molded body against water and the dimensional stability against water, the hydrophilic group preferably has a structure selected from the group consisting of a hydroxy group, a carboxy group, salts with these groups, and an amide bond; more preferably has a structure selected from the group consisting of a carboxy group, salts with a carboxy group, and an amide bond; and still more preferably has a structure selected from the group consisting of salts with a carboxy group, and an amide bond.

The water-absorbing compound (D) is a water-absorbing compound known in the related art. Examples of the water-absorbing compound (D) include polyvinyl alcohol, polyacrylic acid, polyethylene oxide, water-soluble cellulose, starch, alginic acid, chitin, polysulfonic acid, polyhydroxymethacrylate, polyvinylpolypyrrolidone, isobutylene-maleic acid copolymer, poly(N-vinylacetamide), polyacrylamide, polyethylenimine, polyallylamine, and polyvinylamine.

From the viewpoints of the stress-cracking resistance of the obtained resin molded body against water and the dimensional stability against water, the water-absorbing compound (D) preferably has at least one structure selected from the group consisting of a polyvinylpolypyrrolidone structure, a polyacrylic acid salt structure, a polyvinyl butyral structure, and an isobutylene-maleic acid copolymer structure, more preferably has at least one structure selected from the group consisting of a polyvinylpolypyrrolidone structure and a polyacrylic acid salt structure, and is still more preferably polyvinylpolypyrrolidone or a polyacrylic acid salt.

The counterion for the polyacrylic acid salt is preferably, but not necessarily, one of primary to quaternary ammonium ions or an alkali metal ion, more preferably an alkali metal ion, and more preferably a sodium ion.

Polymer (E): Component (E)

The polymer (E) is at least one polymer selected from core-shell structure polymers having a core layer and a shell layer formed on the surface of the core layer and containing a polymer of an alkyl (meth)acrylate, and olefin polymers including about 60 mass % or more of a structural unit derived from α-olefin.

The polymer (E) may be, for example, a polymer (thermoplastic elastomer) having, for example, elasticity at ordinary temperature (25° C.) and a property of softening at high temperature like thermoplastic resin.

When the resin composition contains the polymer (E), the obtained resin molded body may have high stress-cracking resistance against water and high dimensional stability against water.

The polymer (E) may be used alone or in combination of two or more.

Core-Shell Structure Polymer

The core-shell structure polymers according to the exemplary embodiment is a core-shell structure polymer having a core layer and a shell layer on the surface of the core layer.

The core-shell structure polymer is a polymer having a core layer as the innermost layer and a shell layer as the outermost layer (specifically, a polymer in which a polymer of an alkyl (meth)acrylate is bonded to a polymer serving as a core layer by graft polymerization to form a shell layer).

The core-shell structure polymer may further include one or more other layers (e.g., 1 or more and 6 or less other layers) between the core layer and the shell layer. When further including other layers, the core-shell structure polymer is a polymer in which plural polymers are bonded to a polymer serving as a core layer by graft polymerization to form a multilayer polymer.

The core layer may be, but not necessarily, a rubber layer. Examples of the rubber layer include layers formed of (meth)acrylic rubber, silicone rubber, styrene rubber, conjugated diene rubber, α-olefin rubber, nitrile rubber, urethane rubber, polyester rubber, and polyamide rubber, and copolymer rubbers of two or more of these rubbers.

Among these rubbers, the rubber layer is preferably a layer formed of, for example, (meth)acrylic rubber, silicone rubber, styrene rubber, conjugated diene rubber, or α-olefin rubber, or a copolymer rubber of two or more of these rubbers.

The rubber layer may be a rubber layer formed by crosslinking through copolymerization using a crosslinker (e.g., divinylbenzene, allyl acrylate, butylene glycol diacrylate).

Examples of the (meth)acrylic rubber include a polymer rubber produced by polymerization of a (meth)acrylic component (e.g., a (meth)acrylic acid alkyl ester having 2 or more and 6 or less carbon atoms).

Examples of the silicone rubber include a rubber formed of a silicone component (e.g., polydimethylsiloxane, polyphenylsiloxane).

Examples of the styrene rubber include a polymer rubber produced by polymerization of a styrene component (e.g., styrene, α-methylstyrene).

Examples of the conjugated diene rubber include a polymer rubber produced by polymerization of a conjugated diene component (e.g., butadiene, isoprene).

Examples of the α-olefin rubber include a polymer rubber produced by polymerization of an α-olefin component (ethylene, propylene, 2-methylpropylene).

Examples of the copolymer rubber include a copolymer rubber produced by polymerization of two or more (meth) acrylic components, a copolymer rubber produced by polymerization of a (meth)acrylic component and a silicone component, and a copolymer of a (meth)acrylic component, a conjugated diene component, and a styrene component.

Examples of the alkyl (meth)acrylate for the polymer forming the shell layer include methyl (meth)acrylate, ethyl (meth)acrylate, n-propyl (meth)acrylate, n-butyl (meth) acrylate, t-butyl (meth)acrylate, n-hexyl (meth)acrylate, 2-ethylhexyl (meth)acrylate, cyclohexyl (meth)acrylate, stearyl (meth)acrylate, and octadecyl (meth)acrylate. At least one hydrogen atom in the alkyl chain of the alkyl (meth)acrylate is optionally substituted with a substituent. Examples of the substituent include an amino group, a hydroxyl group, and a halogen group.

Among these, the polymer of an alkyl (meth)acrylate is preferably a polymer of an alkyl (meth)acrylate having an alkyl chain with 1 or more and 8 or less carbon atoms, more preferably a polymer of an alkyl (meth)acrylate having an alkyl chain with 1 or more and 2 or less carbon atoms, and still more preferably a polymer of an alkyl (meth)acrylate having an alkyl chain with one carbon atom from the viewpoints of the stress-cracking resistance of the obtained resin molded body against water and the dimensional stability against water. In particular, the polymer of an alkyl (meth)acrylate is preferably a copolymer of two or more alkyl acrylates having different carbon atoms.

The polymer forming the shell layer may be a polymer produced by polymerizing at least one selected from glycidyl group-containing vinyl compounds and unsaturated dicarboxylic anhydrides, other than alkyl (meth)acrylates.

Examples of glycidyl group-containing vinyl compounds include glycidyl (meth)acrylate, glycidyl itaconate, diglycidyl itaconate, allyl glycidyl ether, styrene-4-glycidyl ether, and 4-glycidylstyrene.

Examples of unsaturated dicarboxylic anhydrides include maleic anhydride, itaconic anhydride, glutaconic anhydride, citraconic anhydride, and aconitic anhydride. Among these anhydrides, maleic anhydride is preferred.

Examples of one or more other layers between the core layer and the shell layer include layers formed of the polymers described for the shell layer.

The amount of the polymer in the shell layer is preferably 1 mass % or more and 40 mass % or less, more preferably 3 mass % or more and 30 mass % or less, and still more preferably 5 mass % or more and 15 mass % or less relative to the total amount of the core-shell structure polymer.

The average primary particle size of the core-shell structure polymer is not limited but preferably 50 nm or more and 500 nm or less, more preferably 50 nm or more and 400 nm or less, still more preferably 100 nm or more and 300 nm or less, and yet still more preferably 150 nm or more and 250 nm or less from the viewpoints of the stress-cracking resistance of the obtained resin molded body against water and the dimensional stability against water.

The average primary particle size here refers to the value obtained by the following method. Provided that the maximum diameter of each primary particle is a primary particle size, the primary particle sizes of 100 particles are determined through observation of the particles with a scanning electron microscope and averaged out to a number-average primary particle size. Specifically, the average primary particle size is determined by observing the dispersion form of the core-shell structure polymer in the resin composition using a scanning electron microscope.

The core-shell structure polymer may be produced by using a known method.

Examples of the known method include an emulsion polymerization method. Specifically, the following method is illustrated as a production method. First, a monomer mixture is subjected to emulsion polymerization to produce a core particle (core layer). Next, another monomer mixture is subjected to emulsion polymerization in the presence of the core particle (core layer) to produce a core-shell structure polymer in which a shell layer is formed around the core particle (core layer).

When other layers are formed between the core layer and the shell layer, emulsion polymerization of other monomer mixtures is repeated to produce an intended core-shell structure polymer including the core layer, other layers, and the shell layer.

Examples of commercial products of the core-shell structure polymer include "Metablen" (registered trademark) available from Mitsubishi Chemical Corporation, "Kane Ace" (registered trademark) available from Kaneka Corporation, "Paraloid" (registered trademark) available from Dow Chemical Japan Ltd., "Staphyloid" (registered trademark) available from Aica Kogyo Co., Ltd., and "Paraface" (registered trademark) available from Kuraray Co., Ltd.

Olefin Polymer

The olefin polymer is a polymer of an α-olefin and an alkyl (meth)acrylate and preferably an olefin polymer including about 60 mass % or more of the structural unit derived from the α-olefin.

Examples of the α-olefin for the olefin polymer include ethylene, propylene, and 2-methylpropylene. The α-olefin is preferably an α-olefin having 2 or more and 8 or less carbon atoms, and more preferably an α-olefin having 2 or more and 3 or less carbon atoms from the viewpoints of the stress-cracking resistance of the obtained resin molded body against water and the dimensional stability against water. Among these α-olefins, ethylene is still more preferred.

Examples of the alkyl (meth)acrylate polymerizable with the α-olefin include methyl (meth)acrylate, ethyl (meth)acrylate, n-propyl (meth)acrylate, n-butyl (meth)acrylate, t-butyl (meth)acrylate, n-hexyl (meth)acrylate, 2-ethylhexyl (meth)acrylate, cyclohexyl (meth)acrylate, stearyl (meth)acrylate, and octadecyl (meth)acrylate. From the viewpoints of the stress-cracking resistance of the obtained resin molded body against water and the dimensional stability against water, the alkyl (meth)acrylate is preferably an alkyl (meth)acrylate having an alkyl chain with 1 or more and 8 or less carbon atoms, more preferably an alkyl (meth) acrylate having an alkyl chain with 1 or more and 4 or less carbon atoms, and still more preferably an alkyl (meth) acrylate having an alkyl chain with 1 or more and 2 or less carbon atoms.

The olefin polymer here may be a polymer of ethylene and methyl acrylate from the viewpoints of the stress-cracking resistance of the obtained resin molded body against water and the dimensional stability against water.

The olefin polymer preferably includes about 60 mass % or more and about 97 mass % or less of a structural unit derived from the α-olefin and more preferably includes about 70 mass % or more and about 85 mass % or less of a structural unit derived from the α-olefin from the viewpoints of the stress-cracking resistance of the obtained resin molded body against water and the dimensional stability against water.

The olefin polymer may include structural units other than the structural unit derived from the α-olefin and the structural unit derived from the alkyl (meth)acrylate. The olefin polymer may include 10 mass % or less of other structural units relative to all structural units.

Poly(meth)acrylate Compound (F): Component (F)

The poly(meth)acrylate compound (F) is a compound (resin) including about 50 mass % or more (preferably about 70 mass % or more, more preferably about 90 mass %, still more preferably about 100 mass %) of a structural unit derived from an alkyl (meth)acrylate.

When the resin composition contains the poly(meth) acrylate compound (F), the obtained resin molded body may have high stress-cracking resistance against water and high dimensional stability against water. The obtained resin molded body may tend to have high elastic modulus.

The poly(meth)acrylate compound (F) may be a compound (resin) including a structural unit derived from a monomer other than (meth)acrylates.

The poly(meth)acrylate compound (F) may include one structural unit (monomer-derived unit) or two or more structural units.

The poly(meth)acrylate compound (F) may be used alone or in combination of two or more.

Examples of the alkyl (meth)acrylate include methyl (meth)acrylate, ethyl (meth)acrylate, n-propyl (meth)acrylate, n-butyl (meth)acrylate, n-pentyl (meth)acrylate, n-hexyl (meth)acrylate, n-heptyl (meth)acrylate, n-octyl (meth)acrylate, n-decyl (meth)acrylate, isopropyl (meth) acrylate, isobutyl (meth)acrylate, t-butyl (meth)acrylate, isopentyl (meth)acrylate, amyl (meth)acrylate, neopentyl (meth)acrylate, isohexyl (meth)acrylate, isoheptyl (meth) acrylate, isooctyl (meth)acrylate, 2-ethylhexyl (meth)acrylate, octyl (meth)acrylate, decyl (meth)acrylate, cyclohexyl (meth)acrylate, and dicyclopentanyl (meth)acrylate.

Among these, the alkyl (meth)acrylate may be an alkyl (meth)acrylate having an alkyl chain with 1 or more and 8 or less carbon atoms (preferably 1 or more and 4 or less carbon atoms, more preferably 1 or more and 2 or less carbon atoms, and still more preferably 1 carbon atom) from the viewpoints of the stress-cracking resistance of the obtained resin molded body against water and the dimensional stability against water.

As the poly(meth)acrylate compound (F) has a shorter alkyl chain, the poly(meth)acrylate compound (F) has a SP value closer to that of the polyester resin (B), which may result in better compatibility between the poly(meth)acrylate compound (F) and the polyester resin (B) and may ensure higher haze.

In other words, the poly(meth)acrylate compound (F) may be a polymer including about 50 mass % or more (preferably about 70 mass % or more, more preferably about 90 mass %, still more preferably about 100 mass %) of a structural unit derived from an alkyl (meth)acrylate having an alkyl chain with 1 or more and 8 or less carbon atoms (preferably 1 or more and 4 or less carbon atoms, more preferably 1 or more and 2 or less carbon atoms, and still more preferably 1 carbon atom).

The poly(meth)acrylate compound (F) may be a polymer including 100 mass % of a structural unit derived from an alkyl (meth)acrylate having an alkyl chain with 1 or more and 8 or less carbon atoms (preferably 1 or more and 4 or less carbon atoms, more preferably 1 or more and 2 or less carbon atoms, still more preferably 1 carbon atom). In other words, the poly(meth)acrylate compound (F) may be a poly(alkyl (meth)acrylate) having an alkyl chain with 1 or more and 8 or less carbon atoms (preferably 1 or more and 4 or less carbon atoms, more preferably 1 or more and 2 or less carbon atoms, still more preferably 1 carbon atom). The poly(alkyl (meth)acrylate) having an alkyl chain with 1 carbon atom may be poly(methyl methacrylate).

Examples of the monomer other than (meth)acrylates in the poly(meth)acrylate compound (F) include styrenes [e.g., monomers having styrene skeletons, such as styrene, alkylated styrenes (e.g., α-methylstyrene, 2-methylstyrene, 3-methylstyrene, 4-methylstyrene, 2-ethylstyrene, 3-ethylstyrene, 4-ethylstyrene), halogenated styrenes (e.g., 2-chlorostyrene, 3-chlorostyrene, 4-chlorostyrene), vinylnaphthalenes (e.g., 2-vinylnaphthalene), and hydroxystyrenes (e.g., 4-ethenylphenol)]; and unsaturated dicarboxylic anhydrides [e.g., compounds having an ethylenic double bond and a dicarboxylic anhydride group, such as maleic anhydride, itaconic anhydride, glutaconic anhydride, citraconic anhydride, and aconitic anhydride].

The weight-average molecular weight (Mw) of the poly (meth)acrylate compound (F) is not limited but may be 15,000 or more and 120,000 or less (preferably more than 20,000 and 100,000 or less, more preferably 22,000 or more and 100,000 or less, and still more preferably 25,000 or more and 100,000 or less).

In particular, from the viewpoints of the stress-cracking resistance of the obtained resin molded body against water and the dimensional stability against water, the weight-average molecular weight (Mw) of the poly(meth)acrylate compound (F) is preferably less than 50,000, more preferably 40,000 or less, and still more preferably 35,000 or less. The weight-average molecular weight (Mw) of the poly (meth)acrylate compound (F) is preferably 15,000 or more.

The weight-average molecular weight (Mw) of the poly (meth)acrylate compound (F) is a value determined by gel permeation chromatography (GPC). Specifically, the determination of the molecular weight by GPC is carried out using HLC-8320GPC available from Tosoh Corporation as a measurement system and using column TSKgel α-M available from Tosoh Corporation and a tetrahydrofuran solvent. The weight-average molecular weight (Mw) is calculated from the molecular weight calibration curve created on the basis of the obtained measurement results using a monodisperse polystyrene standard.

Amount or Mass Ratio for Components (A) to (F)

The amount or the mass ratio of each component will be described. The amount or the mass ratio of each component may be in the following range from the viewpoints of the stress-cracking resistance of the obtained resin molded body against water and the dimensional stability against water. The shortened name for each component is as described below.

Component (A)=cellulose acylate (A)
Component (B)=polyester resin (B)
Component (C)=at least one compound (C) selected from the group consisting of cardanol compounds and ester compounds having a molecular weight of about 250 or more and about 2000 or less
Component (D)=water-absorbing compound (D)
Component (E)=polymer (E)
Component (F)=poly(meth)acrylate compound (F)

The mass ratio (B/A) of the component (B) to the component (A) is preferably about 0.03 or more and about 0.5 or less, more preferably about 0.05 or more and about 0.5 or less, and still more preferably about 0.05 or more and about 0.25 or less.

The mass ratio (C/A) of the component (C) to the component (A) is preferably about 0.02 or more and about 0.5 or less, more preferably about 0.03 or more and about 0.35 or less, and still more preferably about 0.05 or more and about 0.25 or less.

The mass ratio (D/A) of the component (D) to the component (A) is preferably about 0.001 or more and about 0.2 or less, more preferably about 0.001 or more and about 0.15 or less, and still more preferably about 0.002 or more and about 0.1 or less.

The mass ratio (E/A) of the component (E) to the component (A) is preferably 0.01 or more and 0.3 or less, more preferably 0.02 or more and 0.2 or less, and still more preferably 0.05 or more and 0.15 or less.

The mass ratio (F/A) of the component (F) to the component (A) is preferably 0.01 or more and 0.2 or less, more preferably 0.02 or more and 0.15 or less, and still more preferably 0.03 or more and 0.1 or less.

The amount of the component (A) relative to the resin composition is preferably 50 mass % or more, more preferably 60 mass % or more, and still more preferably 70 mass % or more.

Other Components

The resin composition according to the exemplary embodiment may contain other components.

Examples of other components include a flame retardant, a compatibilizer, an antioxidant, a release agent, a light resisting agent, a weathering agent, a colorant, a pigment, a modifier, an anti-drip agent, an antistatic agent, a hydrolysis inhibitor, a filler, and reinforcing agents (e.g., glass fiber, carbon fiber, talc, clay, mica, glass flakes, milled glass, glass beads, crystalline silica, alumina, silicon nitride, aluminum nitride, and boron nitride).

As needed, components (additives), such as a reactive trapping agent and an acid acceptor for avoiding release of acetic acid, may be added. Examples of the acid acceptor include oxides, such as magnesium oxide and aluminum oxide; metal hydroxides, such as magnesium hydroxide, calcium hydroxide, aluminum hydroxide, and hydrotalcite; calcium carbonate; and talc.

Examples of the reactive trapping agent include epoxy compounds, acid anhydride compounds, and carbodiimides.

The amount of each of these components may be 0 mass % or more and 5 mass % or less relative to the total amount of the resin composition. The expression "0 mass %" means that the resin composition is free of a corresponding one of other components.

The resin composition according to the exemplary embodiment may contain resins other than the resins (the cellulose acylate (A), the polyester resin (B), the water-absorbing compound (D), the poly(meth)acrylate compound (F), and the like). When the resin composition contains other resins, the amount of other resins relative to the total amount of the resin composition may be 5 mass % or less and is preferably less than 1 mass %. More preferably, the resin composition is free of other resins (i.e., 0 mass %).

Examples of other resins include thermoplastic resins known in the related art. Specific examples include polycarbonate resin; polypropylene resin; polyester resin; polyolefin resin; polyester-carbonate resin; polyphenylene ether resin; polyphenylene sulfide resin; polysulfone resin; polyether sulfone resin; polyarylene resin; polyetherimide resin; polyacetal resin; polyvinyl acetal resin; polyketone resin; polyether ketone resin; polyether ether ketone resin; polyaryl ketone resin; polyether nitrile resin; liquid crystal resin; polybenzimidazole resin; polyparabanic acid resin; a vinyl polymer or a vinyl copolymer produced by polymerizing or copolymerizing at least one vinyl monomer selected from the group consisting of an aromatic alkenyl compound, a methacrylic acid ester, an acrylic acid ester, and a vinyl cyanide compound; a diene-aromatic alkenyl compound copolymer; a vinyl cyanide-diene-aromatic alkenyl compound copolymer; an aromatic alkenyl compound-diene-vinyl cyanide-N-phenylmaleimide copolymer; a vinyl cyanide-(ethylene-diene-propylene (EPDM))-aromatic alkenyl compound copolymer; polyvinyl chloride resin; and chlorinated polyvinyl chloride resin. These resins may be used alone or in combination of two or more.

Method for Producing Resin Composition

The resin composition according to the exemplary embodiment is produced by, for example, melt-kneading a mixture containing the cellulose acylate (A), the polyester resin (B), the compound (C), the water-absorbing compound (D), and as needed, other components. Alternatively, the resin composition according to the exemplary embodiment is also produced by, for example, dissolving the above-described components in a solvent.

An apparatus used for melt kneading is, for example, a known apparatus. Specific examples of the apparatus include a twin-screw extruder, a Henschel mixer, a Banbury mixer, a single-screw extruder, a multi-screw extruder, and a co-kneader.

Resin Molded Body

A resin molded body according to an exemplary embodiment contains the resin composition according to the exemplary embodiment. In other words, a resin molded body according to an exemplary embodiment has the same composition as the resin composition according to the exemplary embodiment.

The method for forming the resin molded body according to the exemplary embodiment may be injection molding from the viewpoint of a high degree of freedom in shaping. For this point, the resin molded body may be an injection-molded body formed by injection molding.

The cylinder temperature during injection molding is, for example, 160° C. or higher and 280° C. or lower, and preferably 180° C. or higher and 260° C. or lower. The mold temperature during injection molding is, for example, 40° C. or higher and 90° C. or lower, and preferably 60° C. or higher and 80° C. or lower.

Injection molding may be performed using a commercially available apparatus, such as NEX 500 available from Nissei Plastic Industrial Co., Ltd., NEX 150 available from Nissei Plastic Industrial Co., Ltd., NEX 7000 available from Nissei Plastic Industrial Co., Ltd., PNX 40 available from Nissei Plastic Industrial Co., Ltd., and SE50D available from Sumitomo Heavy Industries.

The molding method for producing the resin molded body according to the exemplary embodiment is not limited to injection molding described above. Examples of the molding method include extrusion molding, blow molding, heat press molding, calendar molding, coating molding, cast molding, dipping molding, vacuum molding, and transfer molding.

The resin molded body according to the exemplary embodiment is used in various applications, such as electrical and electronic devices, office machines, home appliances, automotive interior materials, toys, and containers. More specifically, the resin molded body is used in housings of electrical and electronic devices and home appliances; various parts of electrical and electronic devices and home appliances; automotive interior parts; block assembly toys; plastic model kits; cases for CD-ROMs, DVDs, and the like; tableware; drink bottles; food trays; wrapping materials; films; and sheets.

EXAMPLES

The present invention will be described below in more detail by way of Examples, but the present invention is not limited by these Examples. The unit "part(s)" refers to "part(s) by mass" unless otherwise specified.

Preparation of Materials

The following materials are prepared.

Preparation of Cellulose Acylate (A)

CA1: "CAP 482-20 (Eastman Chemical Company)", cellulose acetate propionate

CA2: "CAP 482-0.5 (Eastman Chemical Company)", cellulose acetate propionate

CA3: "CAP 504-0.2 (Eastman Chemical Company)", cellulose acetate propionate

CA4: "CAB 171-15 (Eastman Chemical Company)", cellulose acetate butylate

CA5: "CAB 381-20 (Eastman Chemical Company)", cellulose acetate butylate

CA6: "CAB 551-0.2 (Eastman Chemical Company)", cellulose acetate butylate

CA7: "L-50 (Daicel Corporation)", diacetyl cellulose

CA8: "LT-35 (Daicel Corporation)", triacetyl cellulose

Preparation of Polyester Resin (B)

PE1: "Ingeo 3001D (NatureWorks LLC)", polylactic acid

PE2: "Terramac TE-2000 (Unitika, Ltd.)", polylactic acid

PE3: "Lacea H-100 (Mitsui Chemicals, Inc.)", polylactic acid

PE4: "Aonilex X151A (Kaneka Corporation)", polyhydroxybutyrate-hexanoate

PE5: "Aonilex X131A (Kaneka Corporation)", polyhydroxybutyrate-hexanoate

PE6: "Vylopet EMC-500 (Toyobo Co., Ltd.)", polyethylene terephthalate

Preparation of Compound (C)

CE1: "Daifatty 101 (Daihachi Chemical Industry Co., Ltd.,)", adipic acid ester-containing compound, molecular weight of adipic acid ester=326 to 378

CE2: "DOA (Daihachi Chemical Industry Co., Ltd.,)" 2-ethylhexyl adipate, molecular weight=371

CE3: "D610A (Mitsubishi Chemical Corporation)", di-n-alkyl adipate (C6, C8, and C10) mixture (R—OOC(CH$_2$)$_4$COO—R, R=n-C$_6$H$_{13}$, n-C$_8$H$_{17}$, n-C$_{10}$H$_{21}$), molecular weight=314 to 427

CE4: "HA-5 (Kao Corporation)", adipic acid polyester, molecular weight=750

CE5: "D623 (Mitsubishi Chemical Corporation)", adipic acid polyester, molecular weight=1800

CE6: "Citrofol AI (jungbunzlauer)", triethyl citrate, molecular weight=276

CE7: "DBS (Daihachi Chemical Industry Co., Ltd.,)" dibutyl sebacate, molecular weight=314

CE8: "DESU (Daihachi Chemical Industry Co., Ltd.,)", diethyl succinate, molecular weight=170

CE9: "D645 (Mitsubishi Chemical Corporation)", adipic acid polyester, molecular weight=2200

CE10: "NC 513 (Cardolite)", cardanol glycidyl ether, molecular weight=356

CE11: "NX 2024 (Cardolite)", cardanol, molecular weight=300

Preparation of Water-Absorbing Compound (D)

CF1: "Polychlal VT (ISP Inc.)", polyvinylpolypyrrolidone, percentage of water absorption=50 to 100 mass %

CF2: "Aqua Keep 10 SH-P (Sumitomo Seika Chemicals Co., Ltd.)", sodium polyacrylate, percentage of water absorption=400 to 800 mass %, median particle size (median size)=160 μm CF3: "Isobam-04 (Kuraray Co., Ltd.)" isobutylene-maleic acid copolymer crosslinked product, molecular weight (Mw)=55,000 to 65,000, percentage of water absorption=50 to 300 mass %

CF4: "Makimousse 7 (Daito Kasei Kogyo Co., Ltd.)", sodium acrylate-grafted starch, percentage of water absorption=50 to 200 mass %, volume average particle size=7 μm CF5: "Mowital B 30 T (Kuraray Co., Ltd.)", polyvinyl butyral, percentage of water absorption=6 to 10 mass %

CF6: "Aqua Keep 10 SH (Sumitomo Seika Chemicals Co., Ltd.)", sodium polyacrylate, percentage of water absorption=600 to 1,000 mass %, median particle size=250 μm CF7: "Aqua Keep SA60SX II (Sumitomo Seika Chemicals Co., Ltd.)", sodium polyacrylate, percentage of water absorption=400 to 800 mass %, median particle size=370 μm Preparation of Polymer (E)

AE1: "Metablen W-600A (Mitsubishi Chemical Corporation)", core-shell structure polymer (a polymer in which a "homopolymer rubber formed from methyl methacrylate and 2-ethylhexyl acrylate" is bonded to a "copolymer rubber formed from 2-ethylhexyl acrylate and n-butyl acrylate" serving as a core layer by graft polymerization to form a shell layer), average primary particle size=200 nm AE2: "Metablen S-2006 (Mitsubishi Chemical Corporation)", core-shell structure polymer (a polymer including a silicone-acrylic rubber as a core layer and a methyl methacrylate polymer as a shell layer), average primary particle size=200 nm AE3: "Paraloid EXL-2315 (Dow Chemical Japan, Ltd.,)", core-shell structure polymer (a polymer in which a "methyl methacrylate polymer" is bonded to a "rubber mainly composed of polybutyl acrylate" serving as a core layer by graft polymerization to form a shell layer), average primary particle size=300 nm AE4: "Lotryl 29MA03 (Arkema K.K.)", olefin polymer (an olefin polymer that is a copolymer of ethylene and methyl acrylate and includes 71 mass % of the structural unit derived from ethylene)

Preparation of Poly(Meth)Acrylate Compound (F)

PM1: "Delpet 720V (Asahi Kasei Corporation)", polymethyl methacrylate (PMMA), Mw=55,000

PM2: "Delpowder 500V (Asahi Kasei Corporation)", polymethyl methacrylate (PMMA), Mw=25,000

PM3: "Sumipex MHF (Sumitomo Chemical Co., Ltd.)", polymethyl methacrylate (PMMA), Mw=9,5000

PM4: "Delpet 980N (Asahi Kasei Corporation)", homo-copolymer of methyl methacrylate (MMA), styrene (St), and maleic anhydride (MAH) (mass ratio=MMA:St:MAH=67:14:19), Mw=110,000

Examples 1 to 58 and Comparative Examples 1 to 14 Kneading and Injection Molding A resin composition (pellets) is produced by performing kneading with a twin-screw kneader (LTE20-44 available from Labtech Engineering) at the preparation composition ratio shown in Tables 1-1, 2-1, 3-1, and 4-1 and the kneading temperature (cylinder temperature) shown in Tables 1-2, 2-2, 3-2, and 4-2.

The produced pellets are molded into the following resin molded bodies (1) to (2) using an injection molding machine (NEX 5001 available from Nissei Plastic Industrial Co., Ltd.) at an injection peak pressure of less than 180 MPa and the molding temperature (cylinder temperature) and the mold temperature shown in Tables 1-2, 2-2, 3-2, and 4-2.

(1): D12 test piece (size: 60 mm×60 mm×2 mm thick)

(2): ISO multi-purpose dumbbell (measurement part 10 mm wide×4 mm thick)

Evaluation

The produced resin molded bodies are subjected to the following evaluation. The evaluation results are shown in Tables 1-2, 2-2, 3-2, and 4-2.

Percentage of Water Absorption

The molded D12 test piece is stored in a room with a temperature (25° C.) and a relative humidity of 50% for 24 hours. The weight of the D12 test piece is measured and considered as the weight before water absorption.

In a room at 25° C., the D12 test piece is then immersed in a thermostatic water bath containing distilled water with a temperature of 25° C. At 24 hours after the immersion starts, the D12 test piece is taken out of the water bath, and all water on the surface of the D12 test piece is removed with a dry cloth or filter paper. The weight of the D12 test piece measured within 1 minute after removal of water is considered as the weight after water absorption.

Dimensional Stability

The percentages of dimensional change of the D12 test piece, which is obtained in the measurement of the percentage of water absorption, in the longitudinal direction (machine direction, MD) and the width direction (transverse direction, TD) after 24 hours are measured with a measuring microscope (STM6-LM available from Olympus Corporation).

The percentage of dimensional change due to water absorption shown in Tables 1-2, 2-2, 3-2, and 4-2 is a mean value (%) of the percentage (%) of change in the longitudinal direction (MD) and the percentage (%) of change in the width direction (TD), provided that the length (in the MD) and the width (in the TD) before immersion in water are assumed to be 100(%).

Stress-Cracking Resistance

The obtained ISO multiple-purpose dumbbell is tested for its stress-cracking resistance against water according to a method described in ISO 6252 (1992). Distilled water is used as a test liquid. The dumbbell is left to stand in an environment at 50° C. and under a loading condition of a strain percentage of 1%, and the average value of the time until breakage occurs for 5 test pieces is obtained. The evaluation criteria are as described below.

A: No breakage occurs.
B: Breakage occurs after 1,000 hours or more.
C: Breakage occurs after 100 hours or more but less than 1,000 hours.
D: Breakage occurs after less than 100 hours.

TABLE 1-1

| | Composition | | | | | | | | | |
|---|---|---|---|---|---|---|---|---|---|---|
| | Component (A) | Amount (parts) | Component (B) | Amount (parts) | Component (C) | Amount (parts) | Component (D) | Amount (parts) | Component (E) | Amount (parts) |
| Example 1 | CA1 | 100 | PE1 | 10 | CE1 | 10 | CF1 | 5 | | |
| Example 2 | CA1 | 100 | PE1 | 10 | CE1 | 10 | CF1 | 5 | AE1 | 10 |

TABLE 1-1-continued

| | Composition | | | | | | | | |
|---|---|---|---|---|---|---|---|---|---|
| Example 3 | CA2 | 100 | PE1 | 10 | CE1 | 10 | CF1 | 5 | AE1 | 10 |
| Example 4 | CA3 | 100 | PE1 | 10 | CE1 | 10 | CF1 | 5 | AE1 | 10 |
| Example 5 | CA4 | 100 | PE1 | 10 | CE1 | 10 | CF1 | 5 | AE1 | 10 |
| Example 6 | CA5 | 100 | PE1 | 10 | CE1 | 10 | CF1 | 5 | AE1 | 10 |
| Example 7 | CA6 | 100 | PE1 | 10 | CE1 | 10 | CF1 | 5 | AE1 | 10 |
| Example 8 | CA7 | 100 | PE1 | 10 | CE1 | 10 | CF1 | 5 | AE1 | 10 |
| Example 9 | CA8 | 100 | PE1 | 10 | CE1 | 10 | CF1 | 5 | AE1 | 10 |
| Example 10 | CA1 | 100 | PE2 | 10 | CE1 | 10 | CF1 | 5 | AE1 | 10 |
| Example 11 | CA1 | 100 | PE3 | 10 | CE1 | 10 | CF1 | 5 | AE1 | 10 |
| Example 12 | CA1 | 100 | PE4 | 10 | CE1 | 10 | CF1 | 5 | AE1 | 10 |
| Example 13 | CA1 | 100 | PE5 | 10 | CE1 | 10 | CF1 | 5 | AE1 | 10 |
| Example 14 | CA1 | 100 | PE6 | 10 | CE1 | 10 | CF1 | 5 | AE1 | 10 |
| Example 15 | CA1 | 100 | PE1 | 10 | CE2 | 10 | CF1 | 5 | AE1 | 10 |
| Example 16 | CA1 | 100 | PE1 | 10 | CE3 | 10 | CF1 | 5 | AE1 | 10 |
| Example 17 | CA1 | 100 | PE1 | 10 | CE4 | 10 | CF1 | 5 | AE1 | 10 |
| Example 18 | CA1 | 100 | PE1 | 10 | CE5 | 10 | CF1 | 5 | AE1 | 10 |
| Example 19 | CA1 | 100 | PE1 | 10 | CE6 | 10 | CF1 | 5 | AE1 | 10 |
| Example 20 | CA1 | 100 | PE1 | 10 | CE7 | 10 | CF1 | 5 | AE1 | 10 |

| | Composition | | Composition Ratio | | | | |
|---|---|---|---|---|---|---|---|
| | Component (F) | Amount (parts) | Component (B)/ Component (A) | Component (C)/ Component (A) | Component (D)/ Component (A) | Component (E)/ Component (A) | Component (F)/ Component (A) |
| Example 1 | | | 0.1 | 0.1 | 0.05 | | |
| Example 2 | | | 0.1 | 0.1 | 0.05 | 0.1 | |
| Example 3 | | | 0.1 | 0.1 | 0.05 | 0.1 | |
| Example 4 | | | 0.1 | 0.1 | 0.05 | 0.1 | |
| Example 5 | | | 0.1 | 0.1 | 0.05 | 0.1 | |
| Example 6 | | | 0.1 | 0.1 | 0.05 | 0.1 | |
| Example 7 | | | 0.1 | 0.1 | 0.05 | 0.1 | |
| Example 8 | | | 0.1 | 0.1 | 0.05 | 0.1 | |
| Example 9 | | | 0.1 | 0.1 | 0.05 | 0.1 | |
| Example 10 | | | 0.1 | 0.1 | 0.05 | 0.1 | |
| Example 11 | | | 0.1 | 0.1 | 0.05 | 0.1 | |
| Example 12 | | | 0.1 | 0.1 | 0.05 | 0.1 | |
| Example 13 | | | 0.1 | 0.1 | 0.05 | 0.1 | |
| Example 14 | | | 0.1 | 0.1 | 0.05 | 0.1 | |
| Example 15 | | | 0.1 | 0.1 | 0.05 | 0.1 | |
| Example 16 | | | 0.1 | 0.1 | 0.05 | 0.1 | |
| Example 17 | | | 0.1 | 0.1 | 0.05 | 0.1 | |
| Example 18 | | | 0.1 | 0.1 | 0.05 | 0.1 | |
| Example 19 | | | 0.1 | 0.1 | 0.05 | 0.1 | |
| Example 20 | | | 0.1 | 0.1 | 0.05 | 0.1 | |

TABLE 1-2

| | Process Temperature | | | Evaluation | | |
|---|---|---|---|---|---|---|
| | Kneading Temperature (°C.) | Molding Temperature (°C.) | Mold Temperature (°C.) | Percentage (%) of Water Absorption | Percentage (%) of Dimensional Change | Stress-cracking Resistance |
| Example 1 | 200 | 200 | 50 | 0.80 | 0.17 | A |
| Example 2 | 200 | 200 | 50 | 0.74 | 0.15 | A |
| Example 3 | 200 | 200 | 50 | 0.74 | 0.15 | A |
| Example 4 | 200 | 200 | 50 | 0.74 | 0.15 | A |
| Example 5 | 200 | 200 | 50 | 0.74 | 0.15 | A |
| Example 6 | 200 | 200 | 50 | 0.74 | 0.15 | A |
| Example 7 | 200 | 200 | 50 | 0.74 | 0.15 | A |
| Example 8 | 200 | 200 | 50 | 0.74 | 0.15 | B |
| Example 9 | 200 | 200 | 50 | 0.74 | 0.15 | B |
| Example 10 | 200 | 200 | 50 | 0.74 | 0.15 | A |
| Example 11 | 200 | 200 | 50 | 0.74 | 0.15 | A |
| Example 12 | 200 | 200 | 50 | 0.74 | 0.15 | A |
| Example 13 | 200 | 200 | 50 | 0.74 | 0.15 | A |
| Example 14 | 200 | 200 | 50 | 0.74 | 0.15 | B |
| Example 15 | 200 | 200 | 50 | 0.74 | 0.15 | A |
| Example 16 | 200 | 200 | 50 | 0.74 | 0.15 | A |
| Example 17 | 200 | 200 | 50 | 0.74 | 0.15 | A |
| Example 18 | 200 | 200 | 50 | 0.74 | 0.15 | A |
| Example 19 | 200 | 200 | 50 | 0.74 | 0.15 | B |
| Example 20 | 200 | 200 | 50 | 0.74 | 0.15 | B |

TABLE 2-1

| | Composition | | | | | | | | | |
|---|---|---|---|---|---|---|---|---|---|---|
| | Component (A) | Amount (parts) | Component (B) | Amount (parts) | Component (C) | Amount (parts) | Component (D) | Amount (parts) | Component (E) | Amount (parts) |
| Example 21 | CA1 | 100 | PE1 | 10 | CE1 | 10 | CF2 | 5 | AE1 | 10 |
| Example 22 | CA1 | 100 | PE1 | 10 | CE1 | 10 | CF3 | 5 | AE1 | 10 |
| Example 23 | CA1 | 100 | PE1 | 10 | CE1 | 10 | CF4 | 5 | AE1 | 10 |
| Example 24 | CA1 | 100 | PE1 | 10 | CE1 | 10 | CF5 | 5 | AE1 | 10 |
| Example 25 | CA1 | 100 | PE1 | 10 | CE1 | 10 | CF6 | 5 | AE1 | 10 |
| Example 26 | CA1 | 100 | PE1 | 10 | CE1 | 10 | CF7 | 5 | AE1 | 10 |
| Example 27 | CA1 | 100 | PE1 | 5 | CE1 | 10 | CF1 | 5 | | |
| Example 28 | CA1 | 100 | PE1 | 50 | CE1 | 10 | CF1 | 5 | | |
| Example 29 | CA1 | 100 | PE1 | 5 | CE1 | 10 | CF1 | 5 | AE1 | 10 |
| Example 30 | CA1 | 100 | PE1 | 50 | CE1 | 10 | CF1 | 5 | AE1 | 10 |
| Example 31 | CA1 | 100 | PE1 | 3 | CE1 | 10 | CF1 | 5 | | |
| Example 32 | CA1 | 100 | PE1 | 55 | CE1 | 10 | CF1 | 5 | | |
| Example 33 | CA1 | 100 | PE1 | 3 | CE1 | 10 | CF1 | 5 | AE1 | 10 |
| Example 34 | CA1 | 100 | PE1 | 55 | CE1 | 10 | CF1 | 5 | AE1 | 10 |
| Example 35 | CA1 | 100 | PE1 | 10 | CE1 | 2 | CF1 | 5 | | |
| Example 36 | CA1 | 100 | PE1 | 10 | CE1 | 15 | CF1 | 5 | | |
| Example 37 | CA1 | 100 | PE1 | 10 | CE1 | 2 | CF1 | 5 | AE1 | 10 |
| Example 38 | CA1 | 100 | PE1 | 10 | CE1 | 15 | CF1 | 5 | AE1 | 10 |

| | Composition | | Composition Ratio | | | |
|---|---|---|---|---|---|---|
| | Component (F) | Amount (parts) | Component (B)/ Component (A) | Component (C)/ Component (A) | Component (D)/ Component (A) | Component (E)/ Component (A) | Component (F)/ Component (A) |
| Example 21 | | | 0.1 | 0.1 | 0.05 | 0.1 | |
| Example 22 | | | 0.1 | 0.1 | 0.05 | 0.1 | |
| Example 23 | | | 0.1 | 0.1 | 0.05 | 0.1 | |
| Example 24 | | | 0.1 | 0.1 | 0.05 | 0.1 | |
| Example 25 | | | 0.1 | 0.1 | 0.05 | 0.1 | |
| Example 26 | | | 0.1 | 0.1 | 0.05 | 0.1 | |
| Example 27 | | | 0.05 | 0.1 | 0.05 | | |
| Example 28 | | | 0.5 | 0.1 | 0.05 | | |
| Example 29 | | | 0.05 | 0.1 | 0.05 | 0.1 | |
| Example 30 | | | 0.5 | 0.1 | 0.05 | 0.1 | |
| Example 31 | | | 0.03 | 0.1 | 0.05 | | |
| Example 32 | | | 0.55 | 0.1 | 0.05 | | |
| Example 33 | | | 0.03 | 0.1 | 0.05 | 0.1 | |
| Example 34 | | | 0.55 | 0.1 | 0.05 | 0.1 | |
| Example 35 | | | 0.1 | 0.02 | 0.05 | | |
| Example 36 | | | 0.1 | 0.15 | 0.05 | | |
| Example 37 | | | 0.1 | 0.02 | 0.05 | 0.1 | |
| Example 38 | | | 0.1 | 0.15 | 0.05 | 0.1 | |

TABLE 2-2

| | Process Temperature | | | Evaluation | | |
|---|---|---|---|---|---|---|
| | Kneading Temperature (° C.) | Molding Temperature (° C.) | Mold Temperature (° C.) | Percentage (%) of Water Absorption | Percentage (%) of Dimensional Change | Stress-cracking Resistance |
| Example 21 | 200 | 200 | 50 | 0.74 | 0.15 | A |
| Example 22 | 200 | 200 | 50 | 0.74 | 0.15 | A |
| Example 23 | 200 | 200 | 50 | 0.74 | 0.15 | A |
| Example 24 | 200 | 200 | 50 | 1.06 | 0.38 | B |
| Example 25 | 200 | 200 | 50 | 0.64 | 0.11 | A |
| Example 26 | 200 | 200 | 50 | 0.71 | 0.13 | A |
| Example 27 | 200 | 200 | 50 | 0.83 | 0.17 | A |
| Example 28 | 190 | 190 | 50 | 0.61 | 0.13 | A |
| Example 29 | 200 | 200 | 50 | 0.77 | 0.16 | A |
| Example 30 | 190 | 190 | 50 | 0.57 | 0.12 | A |
| Example 31 | 200 | 200 | 50 | 0.85 | 0.18 | B |
| Example 32 | 190 | 190 | 50 | 0.59 | 0.12 | B |
| Example 33 | 200 | 200 | 50 | 0.78 | 0.16 | B |
| Example 34 | 190 | 190 | 50 | 0.56 | 0.11 | B |
| Example 35 | 200 | 200 | 50 | 0.85 | 0.18 | A |

TABLE 2-2-continued

|  | Process Temperature | | | Evaluation | | |
|---|---|---|---|---|---|---|
|  | Kneading Temperature (° C.) | Molding Temperature (° C.) | Mold Temperature (° C.) | Percentage (%) of Water Absorption | Percentage (%) of Dimensional Change | Stress-cracking Resistance |
| Example 36 | 190 | 190 | 50 | 0.77 | 0.16 | A |
| Example 37 | 220 | 220 | 50 | 0.79 | 0.16 | A |
| Example 38 | 190 | 190 | 50 | 0.71 | 0.15 | A |

TABLE 3-1

|  | Composition | | | | | | | | | |
|---|---|---|---|---|---|---|---|---|---|---|
|  | Component (A) | Amount (parts) | Component (B) | Amount (parts) | Component (C) | Amount (parts) | Component (D) | Amount (parts) | Component (E) | Amount (parts) |
| Example 39 | CA1 | 100 | PE1 | 10 | CE1 | 1 | CF1 | 5 | | |
| Example 40 | CA1 | 100 | PE1 | 10 | CE1 | 18 | CF1 | 5 | | |
| Example 41 | CA1 | 100 | PE1 | 10 | CE1 | 1 | CF1 | 5 | AE1 | 10 |
| Example 42 | CA1 | 100 | PE1 | 10 | CE1 | 18 | CF1 | 5 | AE1 | 10 |
| Example 43 | CA1 | 100 | PE1 | 10 | CE1 | 10 | CF1 | 0.1 | | |
| Example 44 | CA1 | 100 | PE1 | 10 | CE1 | 10 | CF1 | 20 | | |
| Example 45 | CA1 | 100 | PE1 | 10 | CE1 | 10 | CF1 | 0.1 | AE1 | 10 |
| Example 46 | CA1 | 100 | PE1 | 10 | CE1 | 10 | CF1 | 20 | AE1 | 10 |
| Example 47 | CA1 | 100 | PE1 | 10 | CE1 | 10 | CF1 | 0.05 | | |
| Example 48 | CA1 | 100 | PE1 | 10 | CE1 | 10 | CF1 | 22 | | |
| Example 49 | CA1 | 100 | PE1 | 10 | CE1 | 10 | CF1 | 0.05 | AE1 | 10 |
| Example 50 | CA1 | 100 | PE1 | 10 | CE1 | 10 | CF1 | 22 | AE1 | 10 |
| Example 51 | CA1 | 100 | PE1 | 10 | CE1 | 10 | CF1 | 5 | AE2 | 10 |
| Example 52 | CA1 | 100 | PE1 | 10 | CE1 | 10 | CF1 | 5 | AE3 | 10 |
| Example 53 | CA1 | 100 | PE1 | 10 | CE1 | 10 | CF1 | 5 | AE4 | 10 |
| Example 54 | CA1 | 100 | PE1 | 5 | CE1 | 10 | CF1 | 5 | | |
| Example 55 | CA1 | 100 | PE1 | 5 | CE1 | 10 | CF1 | 5 | AE1 | 10 |
| Example 56 | CA1 | 100 | PE1 | 5 | CE1 | 10 | CF1 | 5 | AE1 | 10 |
| Example 57 | CA1 | 100 | PE1 | 5 | CE1 | 10 | CF1 | 5 | AE1 | 10 |
| Example 58 | CA1 | 100 | PE1 | 5 | CE1 | 10 | CF1 | 5 | AE1 | 10 |

|  | Composition | | Composition Ratio | | | | |
|---|---|---|---|---|---|---|---|
|  | Component (F) | Amount (parts) | Component (B)/ Component (A) | Component (C)/ Component (A) | Component (D)/ Component (A) | Component (E)/ Component (A) | Component (F)/ Component (A) |
| Example 39 | | | 0.1 | 0.01 | 0.05 | | |
| Example 40 | | | 0.1 | 0.18 | 0.05 | | |
| Example 41 | | | 0.1 | 0.01 | 0.05 | 0.1 | |
| Example 42 | | | 0.1 | 0.18 | 0.05 | 0.1 | |
| Example 43 | | | 0.1 | 0.1 | 0.001 | | |
| Example 44 | | | 0.1 | 0.1 | 0.2 | | |
| Example 45 | | | 0.1 | 0.1 | 0.001 | 0.1 | |
| Example 46 | | | 0.1 | 0.1 | 0.2 | 0.1 | |
| Example 47 | | | 0.1 | 0.1 | 0.0005 | | |
| Example 48 | | | 0.1 | 0.1 | 0.22 | | |
| Example 49 | | | 0.1 | 0.1 | 0.0005 | 0.1 | |
| Example 50 | | | 0.1 | 0.1 | 0.22 | 0.1 | |
| Example 51 | | | 0.1 | 0.1 | 0.05 | 0.1 | |
| Example 52 | | | 0.1 | 0.1 | 0.05 | 0.1 | |
| Example 53 | | | 0.1 | 0.1 | 0.05 | 0.1 | |
| Example 54 | PM1 | 5 | 0.05 | 0.1 | 0.05 | | 0.05 |
| Example 55 | PM1 | 5 | 0.05 | 0.1 | 0.05 | 0.1 | 0.05 |
| Example 56 | PM2 | 5 | 0.05 | 0.1 | 0.05 | 0.1 | 0.05 |
| Example 57 | PM3 | 5 | 0.05 | 0.1 | 0.05 | 0.1 | 0.05 |
| Example 58 | PM4 | 5 | 0.05 | 0.1 | 0.05 | 0.1 | 0.05 |

TABLE 3-2

| | Process Temperature | | | Evaluation | | |
|---|---|---|---|---|---|---|
| | Kneading Temperature (° C.) | Molding Temperature (° C.) | Mold Temperature (° C.) | Percentage (%) of Water Absorption | Percentage (%) of Dimensional Change | Stress-cracking Resistance |
| Example 39 | 220 | 220 | 50 | 0.86 | 0.18 | B |
| Example 40 | 190 | 190 | 50 | 0.75 | 0.16 | B |
| Example 41 | 220 | 220 | 50 | 0.79 | 0.16 | B |
| Example 42 | 190 | 190 | 50 | 0.70 | 0.14 | B |
| Example 43 | 220 | 220 | 50 | 0.83 | 0.17 | A |
| Example 44 | 200 | 200 | 50 | 0.71 | 0.15 | A |
| Example 45 | 200 | 200 | 50 | 0.77 | 0.16 | A |
| Example 46 | 200 | 200 | 50 | 0.67 | 0.14 | A |
| Example 47 | 200 | 200 | 50 | 0.83 | 0.17 | B |
| Example 48 | 200 | 200 | 50 | 0.70 | 0.15 | B |
| Example 49 | 200 | 200 | 50 | 0.77 | 0.16 | B |
| Example 50 | 200 | 200 | 50 | 0.66 | 0.14 | B |
| Example 51 | 200 | 200 | 50 | 0.74 | 0.15 | A |
| Example 52 | 200 | 200 | 50 | 0.74 | 0.15 | A |
| Example 53 | 200 | 200 | 50 | 0.74 | 0.15 | A |
| Example 54 | 200 | 200 | 50 | 0.80 | 0.17 | A |
| Example 55 | 200 | 200 | 50 | 0.74 | 0.22 | A |
| Example 56 | 200 | 200 | 50 | 0.74 | 0.15 | A |
| Example 57 | 200 | 200 | 50 | 0.74 | 0.15 | A |
| Example 58 | 200 | 200 | 50 | 0.74 | 0.15 | A |

TABLE 4-1

| | Composition | | | | | | | | | |
|---|---|---|---|---|---|---|---|---|---|---|
| | Component (A) | Amount (parts) | Component (B) | Amount (parts) | Component (C) | Amount (parts) | Component (D) | Amount (parts) | Component (E) | Amount (parts) |
| Comparative Example 1 | CA1 | 100 | | | | | | | | |
| Comparative Example 2 | CA1 | 100 | PE1 | 10 | | | | | | |
| Comparative Example 3 | CA1 | 100 | | | CE1 | 10 | | | | |
| Comparative Example 4 | CA1 | 100 | | | | | CF1 | 5 | | |
| Comparative Example 5 | CA1 | 100 | PE1 | 10 | CE1 | 10 | | | | |
| Comparative Example 6 | CA1 | 100 | PE1 | 10 | | | CF1 | 5 | | |
| Comparative Example 7 | CA1 | 100 | | | CE1 | 10 | CF1 | 5 | | |
| Comparative Example 8 | CA1 | 100 | | | | | | | AE1 | 10 |
| Comparative Example 9 | CA1 | 100 | PE1 | 10 | | | | | AE1 | 10 |
| Comparative Example 10 | CA1 | 100 | | | CE1 | 10 | | | AE1 | 10 |
| Comparative Example 11 | CA1 | 100 | | | | | CF1 | 5 | AE1 | 10 |
| Comparative Example 12 | CA1 | 100 | PE1 | 10 | CE1 | 10 | | | AE1 | 10 |
| Comparative Example 13 | CA1 | 100 | PE1 | 10 | | | CF1 | 5 | AE1 | 10 |
| Comparative Example 14 | CA1 | 100 | | | CE1 | 10 | CF1 | 5 | AE1 | 10 |

| | Composition | | Composition Ratio | | | | |
|---|---|---|---|---|---|---|---|
| | Component (F) | Amount (parts) | Component (B)/ Component (A) | Component (C)/ Component (A) | Component (D)/ Component (A) | Component (E)/ Component (A) | Component (F)/ Component (A) |
| Comparative Example 1 | | | | | | | |
| Comparative Example 2 | | | 0.1 | | | | |
| Comparative Example 3 | | | | 0.1 | | | |

TABLE 4-1-continued

|  | Col1 | Col2 | Col3 | Col4 |
|---|---|---|---|---|
| Comparative Example 4 |  |  | 0.05 |  |
| Comparative Example 5 | 0.1 | 0.1 |  |  |
| Comparative Example 6 | 0.1 |  | 0.05 |  |
| Comparative Example 7 |  | 0.1 | 0.05 |  |
| Comparative Example 8 |  |  |  | 0.1 |
| Comparative Example 9 | 0.1 |  |  | 0.1 |
| Comparative Example 10 |  | 0.1 |  | 0.1 |
| Comparative Example 11 |  |  | 0.05 | 0.1 |
| Comparative Example 12 | 0.1 | 0.1 |  | 0.1 |
| Comparative Example 13 | 0.1 |  | 0.05 | 0.1 |
| Comparative Example 14 |  | 0.1 | 0.05 | 0.1 |

TABLE 4-2

|  | Process Temperature | | | Evaluation | | |
|---|---|---|---|---|---|---|
|  | Kneading Temperature (° C.) | Molding Temperature (° C.) | Mold Temperature (° C.) | Percentage (%) of Water Absorption | Percentage (%) of Dimensional Change | Stress-cracking Resistance |
| Comparative Example 1 | 240 | 240 | 50 | 2.80 | 0.78 | A |
| Comparative Example 2 | 230 | 230 | 50 | 2.55 | 0.71 | B |
| Comparative Example 3 | 220 | 220 | 50 | 2.55 | 0.71 | A |
| Comparative Example 4 | 240 | 240 | 50 | 2.67 | 0.75 | C |
| Comparative Example 5 | 210 | 210 | 50 | 2.33 | 0.65 | A |
| Comparative Example 6 | 240 | 240 | 50 | 2.43 | 0.68 | C |
| Comparative Example 7 | 220 | 220 | 50 | 0.87 | 0.24 | D |
| Comparative Example 8 | 240 | 240 | 50 | 2.55 | 0.71 | B |
| Comparative Example 9 | 230 | 230 | 50 | 2.33 | 0.65 | B |
| Comparative Example 10 | 220 | 220 | 50 | 2.33 | 0.65 | B |
| Comparative Example 11 | 240 | 240 | 50 | 2.43 | 0.68 | C |
| Comparative Example 12 | 210 | 210 | 50 | 2.15 | 0.60 | B |
| Comparative Example 13 | 240 | 240 | 50 | 2.24 | 0.63 | C |
| Comparative Example 14 | 220 | 220 | 50 | 0.80 | 0.22 | D |

The above-described results indicate that the resin molded bodies according to Examples have higher stress-cracking resistance against water and higher dimensional stability against water than the resin molded bodies according to Comparative Examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin composition comprising:
   cellulose acylate (A);
   a polyester resin (B);
   at least one compound (C) selected from the group consisting of cardanol compounds and ester compounds having a molecular weight of about 250 or more and about 2000 or less;
   a water-absorbing compound (D); and
   at least one polymer (E) that is core-shell structure polymers having a core layer and a shell layer formed on a surface of the core layer and containing a polymer of an alkyl (meth)acrylate.

2. The resin composition according to claim 1, further comprising a poly(meth)acrylate compound (F) including about 50 mass % or more of a structural unit derived from an alkyl (meth)acrylate.

3. The resin composition according to claim 1, wherein the cellulose acylate (A) is at least one selected from cellulose acetate propionate (CAP) and cellulose acetate butyrate (CAB).

4. The resin composition according to claim 1, wherein the polyester resin (B) is a polyhydroxyalkanoate.

5. The resin composition according to claim 4, wherein the polyester resin (B) is polylactic acid.

6. The resin composition according to claim 1, wherein the compound (C) is a fatty acid ester compound.

7. The resin composition according to claim 6, wherein the compound (C) is an adipic acid ester-containing compound.

8. The resin composition according to claim 1, wherein the compound (C) is a cardanol compound.

9. The resin composition according to claim 1, wherein a percentage of water absorption of the water-absorbing compound (D) is about 50 mass % or more.

10. The resin composition according to claim 1, wherein the water-absorbing compound (D) has at least one structure selected from the group consisting of a polyvinylpolypyrrolidone structure, a polyacrylic acid salt structure, a polyvinyl butyral structure, and an isobutylene-maleic anhydride copolymer structure.

11. The resin composition according to claim 1, wherein a mass ratio (B/A) of the polyester resin (B) to the cellulose acylate (A) is about 0.03 or more and about 0.5 or less.

12. The resin composition according to claim 1, wherein a mass ratio (C/A) of the compound (C) to the cellulose acylate (A) is about 0.02 or more and about 0.5 or less.

13. The resin composition according to claim 1, wherein a mass ratio (D/A) of the water-absorbing compound (D) to the cellulose acylate (A) is about 0.001 or more and about 0.2 or less.

14. A resin molded body comprising the resin composition according to claim 1.

15. The resin molded body according to claim 14 that is an injection-molded body.

* * * * *